(12) United States Patent
Williams

(10) Patent No.: US 11,885,088 B2
(45) Date of Patent: Jan. 30, 2024

(54) UNDERGROUND DRAIN TUBE SYSTEMS AND METHODS OF UNDERGROUND INSTALLATION OF DRAIN TUBE SYSTEMS

(71) Applicant: Joseph Alexander Williams, Belington, WV (US)

(72) Inventor: Joseph Alexander Williams, Belington, WV (US)

( * ) Notice: Subject to any disclaimer, the term of this patent is extended or adjusted under 35 U.S.C. 154(b) by 0 days.

(21) Appl. No.: 17/647,854

(22) Filed: Jan. 13, 2022

(65) Prior Publication Data

US 2022/0220685 A1  Jul. 14, 2022

Related U.S. Application Data

(60) Provisional application No. 63/137,379, filed on Jan. 14, 2021.

(51) Int. Cl.
E02B 11/00 (2006.01)
E02D 3/10 (2006.01)
E02B 11/02 (2006.01)

(52) U.S. Cl.
CPC ............ *E02B 11/005* (2013.01); *E02B 11/02* (2013.01); *E02D 3/10* (2013.01)

(58) Field of Classification Search
CPC ........ E02B 11/00; E02B 11/005; E02B 11/02; E02D 3/10; E02D 19/16; E03D 3/12
See application file for complete search history.

(56) References Cited

U.S. PATENT DOCUMENTS

| | | | | |
|---|---|---|---|---|
| 191,876 A * | 6/1877 | Mesler | .................. | E02B 11/005 |
| | | | | 175/314 |
| 855,652 A * | 6/1907 | Mori | ..................... | E02B 11/005 |
| | | | | 405/43 |
| 3,971,222 A * | 7/1976 | Griffith, Jr. | ............... | E02D 3/12 |
| | | | | 405/263 |
| 6,039,508 A * | 3/2000 | White | ..................... | E02D 11/00 |
| | | | | 254/95 |
| 6,254,308 B1 * | 7/2001 | Cognon | .................... | E02D 3/10 |
| | | | | 405/36 |
| 7,097,388 B1 * | 8/2006 | Mansour | ................. | E02D 35/00 |
| | | | | 405/230 |
| 9,551,126 B1 * | 1/2017 | Schmall | ..................... | E02D 3/12 |
| 10,961,682 B1 * | 3/2021 | Williams | .................. | E02D 3/12 |
| 2007/0127988 A1 * | 6/2007 | Nakakuma | ................ | E02D 3/10 |
| | | | | 405/36 |
| 2017/0051465 A1 * | 2/2017 | Foster | ................... | E02B 11/005 |
| 2018/0106006 A1 * | 4/2018 | He | ............................ | E02D 7/28 |
| 2019/0153698 A1 * | 5/2019 | Sun | ............................ | E02D 3/10 |

* cited by examiner

*Primary Examiner* — Benjamin F Fiorello
(74) *Attorney, Agent, or Firm* — Jaensson Law PLLC; Monika L'Orsa Jaensson, Esq.

(57) ABSTRACT

Provided are methods and systems for draining underground soil moisture and water at a site. The methods and systems utilize a secured pipe system having a leading edge to drill the system into the earth, and perforations along portions of the surface of the system to receive accumulated water from underground and deliver it to the surface. A pipe cradle guide as provided is useful in the installation of the system. To also inject soil stabilizing materials (a mixture of sand and gel) into the earth using the secured pipe system, a removable canister is coupled to the distal end of the pipe system, and using water pressure the soil stabilizing materials are delivered to the soil by means of the secured pipe system.

13 Claims, 7 Drawing Sheets

UNDERGROUND DRAIN TUBE SYSTEMS AND METHODS OF UNDERGROUND INSTALLATION OF DRAIN TUBE SYSTEMS

BACKGROUND

The disclosed technology regards underground drain tube systems, and methods of installing drain tube systems underground.

Overly wet soil can be a serious problem to handle. Wet clay will tend to stick to tires and truck beds greatly reducing load and haul efficiency; water can seep through the surface at unwanted places (such as through asphalt, creating dangerous conditions). Underground water in hillsides and cliffs can create slides and slips with disastrous effects. An unstable hillside slope or road base requires major excavation to remove unstable soil and install conventional pipe and gravel to achieve drainage.

Therefore, using current practices extensive effort is required to reduce and redirect the flow of water. Traditional installation of drains include excavation of a trench (including at times the destruction of roadways and other structures), installation of stone, installation of pipe, and then back-filling the trench. Alternatively, massive amounts of earth must be removed to find moisture sources to install drainage to control underground water flow. This process is destructive, expensive, dangerous and time consuming, especially on steep terrain or developed properties, and cause significant disturbance to the surface. The disclosed technology is a very simple solution.

The disclosed technology is a system and method that uses a line or series of steel drainage pipes, tunneled into a soil sub-structure. It can be efficiently delivered to remote sites and installed with limited manpower, without disturbing the ground surface or any structures or roadways thereon. Similarly, it can direct water to limit erosion at water sources, such as ponds and lakes.

GENERAL DESCRIPTION

In an aspect, the disclosed technology provides a method for draining soil moisture and water at a site, beginning with identifying an underground water source or water flow path at a site. Once the water source or flow path, or both, are determined, a specific depth and a specific angle for a secured pipe system to be installed underground can be planned at the site so that when installed, the secured pipe system can penetrate through the water source or water flow path, or both, from a point of origin at, near or above ground. The secured pipe system is constructed in situ from a plurality of steel pipes, which are coupled together by threading at the end(s) of the pipes. The leading pipe of the secured pipe system has a closed pointed tip at its proximal end, and some or all of the pipes have perforations along their surface. The pipe is then installed underground by driving the pipes/system from the point of origin and at the specific angle, until the specific depth is reached, such that a distal end of the secured pipe system extends above the surface of the ground.

To inject soil stabilizing materials (e.g., gel and sand) into the earth around the water source/flow, a canister is coupled to the distal end of the secured pipe system. The canister includes a receptacle for receiving the soil stabilizing materials, an intake tube to receive water pressure, and an output tube to couple with the secured pipe system. Water pressure is then provided from a source to the soil stabilizing materials in the canister so that the mixture and water travel out the canister output tube, into and through the secured pipe system and the perforated surfaces of the secured pipe system, and are released into the ground at or near the water source or water flow path, flowing into and creating cracks in the ground, with sand and gel filling the cracks. Once the application is complete the canister is removed from the end of the secured pipe system, thereby allowing disintegrated gel and water accumulating over time in the ground to flow through the sand cracks into the pipe perforations and out the distal end of the secured pipe system.

In yet another aspect of the disclosed technology, a soil drain pipe system is provided for installation at a site. In this aspect a secured pipe system is assembled from a plurality of steel pipes. The leading pipe of the system has a closed pointed tip at its proximal end to facilitate drilling the system into the earth. Portions of at least some of the pipes have a perforated surface to allow water and other mixtures to flow from the pipe system, and later for the pipe system to collect and remove water from the site. The soil drain pipe system further includes a removable canister to couple with the secured pipe system intended to receive a mixture of gel, sand and pressurized water for application to the ground by means of the secured pipe system.

In yet another aspect of the disclosed technology, a method for injecting a drainage mixture (gel and sand) into soil is provided by coupling a canister to a distal end of an underground secured pipe system. The secured pipe system has a closed pointed tip at its proximal end and a length extending through the soil from a point of origin to a location of water source or water flow. Surface perforations are provided along at least a portion of the length of the secured pipe system. In this method, a drainage mixture comprising a gel and sand is provided in the canister, and water pressure is applied to the mixture in the canister so that the drainage mixture and water travel through the secured pipe system and are forced through the surface perforations of the secured pipe system into the soil. Upon release into the soil the drainage mixture follows and creates cracks and crevices to create a sand and gel filled crack/crevice. The canister is then removed from the end of the secured pipe system. With the secured pipe system in place underground, disintegrated gel and water accumulating over time in the soil flow through the pipe perforations and into the secured pipe system, traveling out the distal end thereof to the surface of the soil.

In another aspect of the disclosed technology, a method for draining soil moisture at a site is provided. In this method, a identifying a soil water source or soil water flow path are identified at a site, and from a determined point of origin for installation of a secured pipe system, a specific depth and a specific angle for the system are determined so that the pipe system when installed penetrates through the soil water source or the soil water flow. The secured pipe system includes a leading closed pointed tip, and perforations along at least a portion of its surface. The secured pipe system is then driven into the soil at the specific angle until the specific depth is reached, with its distal end positioned at the point of origin. Thereby, water accumulating over time in the soil flows through the perforations and the secured pipe system out the distal end thereof to the surface of the soil.

BRIEF DESCRIPTION OF FIGURES

Embodiments of the invention will now be described in conjunction with the accompanying drawings, where.

DETAILED DESCRIPTION

The features and principles of the disclosed technology are described in details and through embodiments below, with reference to the indicated figures. The particular embodiments of the disclosed technology are presented as examples, and should not be understood as limitations of the claimed inventions. The novel features of the disclosed technology can be employed as numerous embodiments within the scope of the disclosed technology. Additional pipes, hammers, guides, and other ancillary equipment necessary for operation of the disclosed technology in accordance with the teachings of this disclosure, the use of which are well known in the art, are not shown in the schematic figures. A person skilled in the art may readily see that various configurations of pipes, tubes, hammers, guides and other standard processing equipment may be employed to achieve desired drainage.

Figure 9:
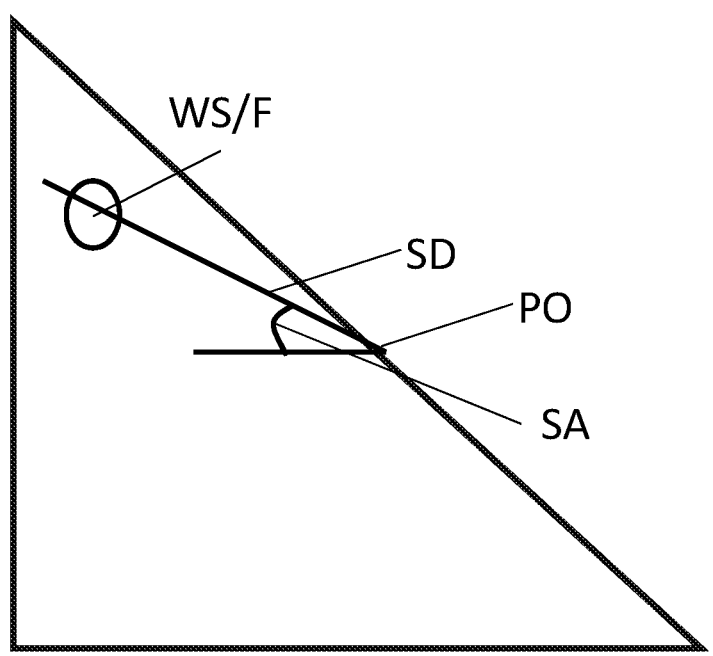
FIG. 9 is a diagram teaching the calculation of the specific depth and specific angle of the disclosed technology.

The present technology utilizes data from geotechnical reports that identify slip planes and moisture content of soil at a site, including water sources and flow paths, for determining the ideal placement of a secured pipe system as herein described. Optimum compaction moisture is usually between 8 and 15% of the dry weight of the soil. When the moisture content is more than about 15%, the ground may be considered too wet and could contribute to or cause destabilization of the earth or structures or roads thereon. Based on the geotechnical report, and specifically the location of water sources and flow paths underground, as shown in FIG. 9 a specific angle SA and a specific depth SD from an exposed point of origin PO can be determined for one or more secured pipe systems to penetrate and divert the underground water source/flow WS/F (see, e.g., FIG. 9). When used herein, the "specific depth" is intended to refer to the underground direct distance from the point of origin through a point at or beyond the water source/flow, as determined by an installer based upon the position of the water source/flow, the point of origin, and the design of the secured pipe system, namely the location of the perforations thereof.

Figure 1:
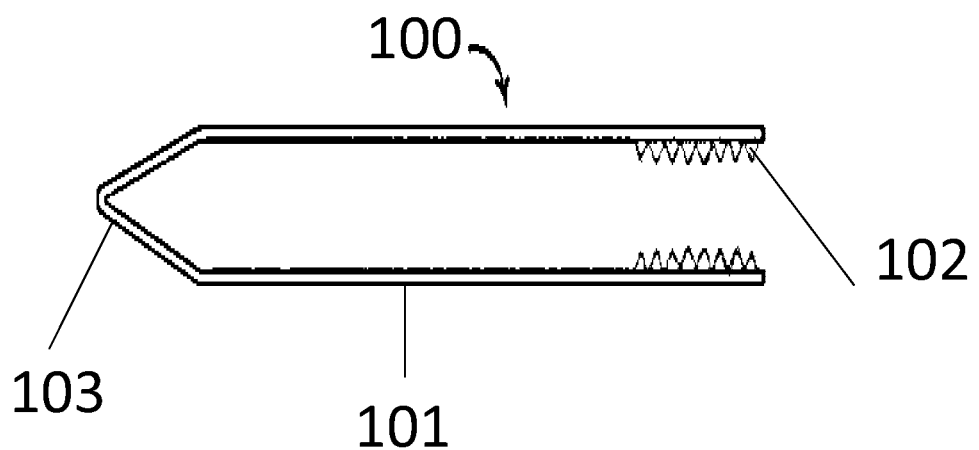
FIG. 1 is a side view of an exemplary embodiment of the leading pipe of the secured pipe system of the disclosed technology.
Figure 2A:
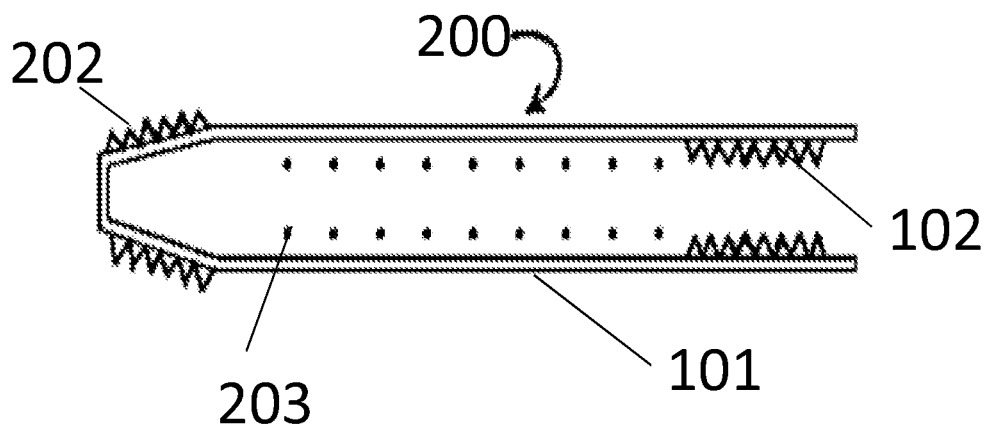
FIG. 2A is a side view of an exemplary embodiment of another pipe (with perforations) of the secured pipe system of the disclosed technology.
Figure 2B:
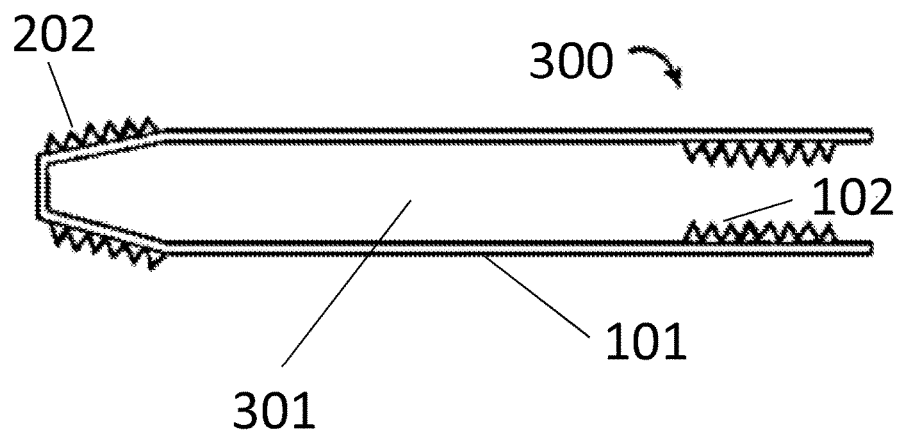
FIG. 2B is a side view of an exemplary embodiment of another pipe (without perforations) of the secured pipe system of the disclosed technology.
Figure 3:
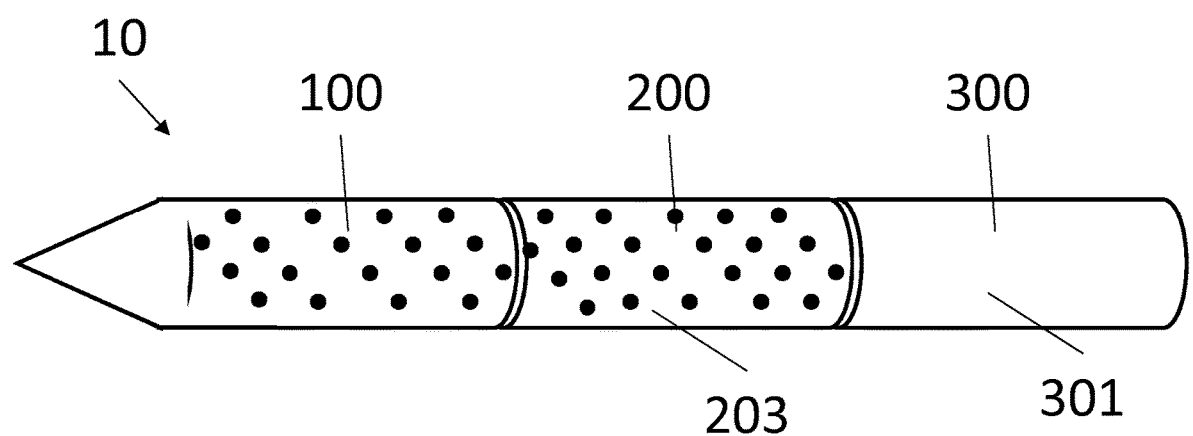
FIG. 3 is a side view of an exemplary embodiment of the secured pipe system of the disclosed technology.

As shown in FIGS. 1-3, the secured pipe system 10 of the disclosed technology includes a series of secured steel pipes 100, 200, 300. The pipes have an approximate length of 3'-5', or about 4', and may have a 2" or similar diameter, thereby making them easily transportable to the site by manpower alone. The pipes further have thick, durable walls 101 capable of sustaining the pressure of installation as hereinafter described. Requisite thickness and composition of the pipes will vary based upon application, with Schedule 20, 40 or 80 pipes being suitable in most applications, as may be determined in relation to the density and composition of the soil. As shown in FIG. 1, a leading pipe 100 with a closed pointed tip 103 at a distal end is provided to penetrate the ground in installation as hereinafter described.

Figure 4:
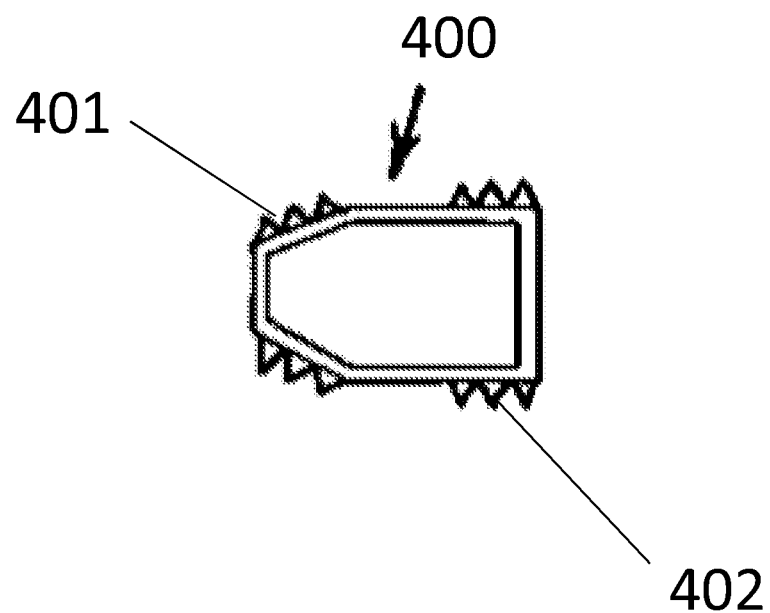
FIG. 4 is a side view of an exemplary embodiment of a connector of the disclosed technology.

The pipes can be connected in a variety of ways to form the secured pipe system 10. For example, as shown in FIGS. 1-3, the pipes may have mating threaded surfaces at their ends, allowing them to screw together and thereby facilitating easy deployment by manpower. In this embodiment threads on the internal or external end surfaces of the pipes can be matingly engaged with those of an adjacent pipe. Alternatively, the pipes may be affixed by means of a hollow connector 400 as depicted in FIG. 4, having threaded surfaces to matingly engage with threaded surfaces on the pipes. Other means to sequentially secure the pipes may be used in furtherance of the disclosed technology, such as internal pipe supports and clamps. In construction a pipe chamfer can be used, and/or lubricant may be applied, to ease the connection of the pipes (directly or by means of connectors). Although the exemplary embodiment shown include three pipes, any number of pipes may be used to form the secured pipe system of the disclosed technology. In order to penetrate the underground water source and/or water flow path, the secured pipe system 10 when completely constructed will have a length at least equal to the specific depth.

As shown in FIGS. 2A and 2B, at least some of the pipes are perforated to facilitate the application of a drainage mixture comprising gel and sand into the soil in accordance with the methods of the disclosed technology, and over time to facilitate the evacuation of water from the soil. In application, other of the pipes may be solid to facilitate application and water evacuation from the site, limiting the potential for water to leak from the pipe system into adjacent areas of the soil. The perforated pipes 200 have holes 203 positioned through the walls, along the length and about the circumference of the pipe, and when installed are positioned near, at or in the water source or water flow path. The holes/perforations may have an exemplary diameter of 5/16", spaced 3"-18" apart, although other sized holes and configurations may also be suitable for the present application.

Figure 6:
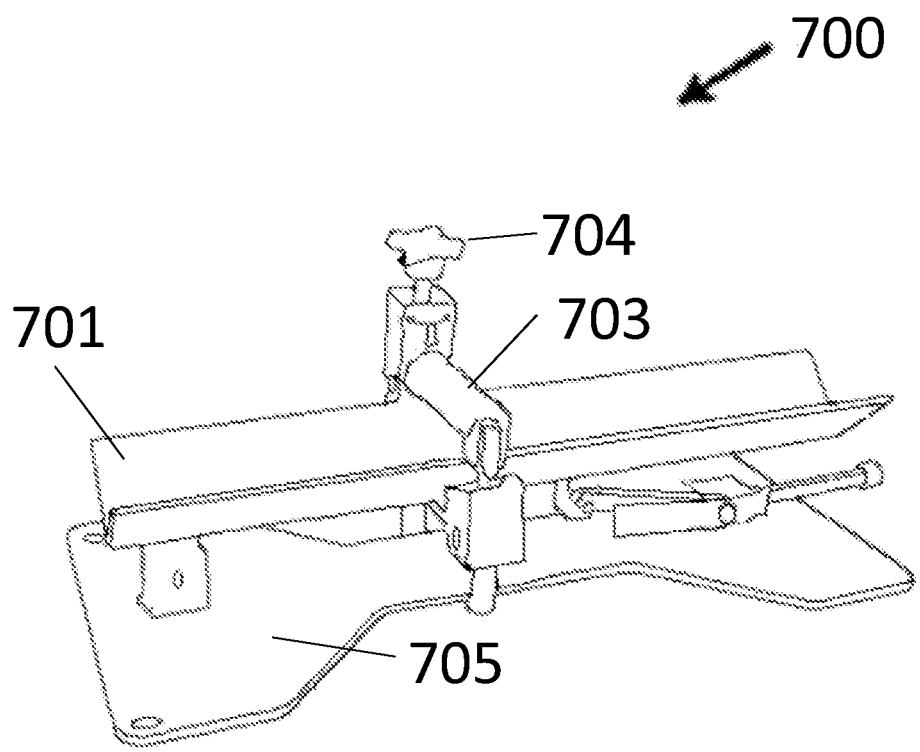
FIG. 6 is a side view of an exemplary embodiment of a pipe guide cradle system of the disclosed technology.

For purposes of installing the secured pipe system 10 in the soil at the specific angle from the point of origin, a pipe guide cradle system 701 may be set at the site. The secured pipe system is then supported by the pipe guide cradle system as it is driven into the soil by means of an air hammer or other similar equipment suitable for such purposes, until it reaches the specific depth, with a perforated pipe of the secured pipe system penetrating a water source or water flow path at the site. An exemplary pipe guide cradle system is shown in FIG. 6 useful in drilling the secured pipe system 10 into a soil sub-structure to ensure the system enters the ground at the determined angle of penetration. Specifically, the guide cradle system 700 comprises a base 705 to support the system on a surface, which can be mounted on a rail or staked into the soil. The secured pipe system 10 is mounted and centered onto the cradle 701 angularly adjustable relative to the base 705 by means of a knob 704 coupled with the cradle; a tube 703 can be mounted onto cradle for holding the length of the pipe in the cradle as it is drilled into the earth.

In driving the secured pipe system into the earth, a variety of air hammers can be used, for example a fixed hammer head air hammer, or a reciprocating hammer head air hammer for harder soil. The hammer can be connected a head tool, such as a 4" pipe pusher for example. An air compressor can also be used to power the hammer at the non-driving end. Any suitable air compressor can be used. For example a 100 cfm air compressor can be used to power the hammer.

It should be noted that the secured pipe system may be constructed during installation by sequentially securing additional pipes as the system is driven into the soil.

Once the secured pipe system is installed by securing and driving pipes 100, 200 and/or 300 underground, a canister 500 is attached to the exposed end thereof. The canister is filled with a drainage mixture including gel and sand, and water pressure is applied to transfer the gel/sand mixture up through the secured pipe system and through the perforated sections thereof, thereby delivering sand and gel into the soil. The water follows the path of least resistance directly to the wet sub-structure, and injects the mixture. After about 12 hours, the gel breaks down and drains back into the secured pipe system, evacuating through the system, and leaving the sand in cracks in the soil.

Figure 5:
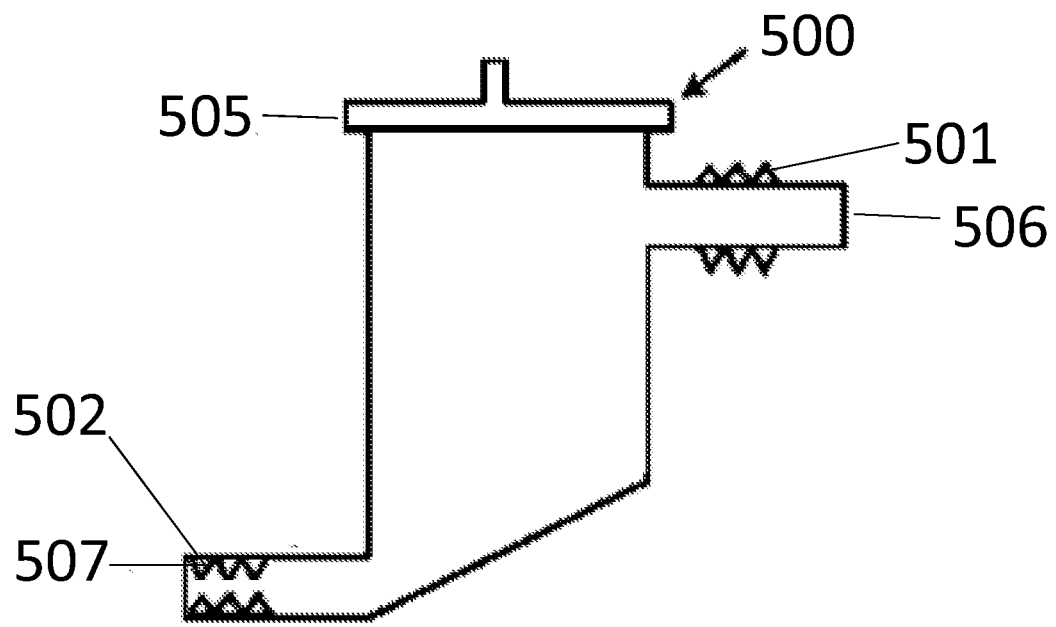
FIG. 5 is a side view of an exemplary embodiment of a canister of the disclosed technology.

FIG. 5 depicts an exemplary canister (or hopper) 500 useful in the disclosed technology. The canister 500 comprises a receptacle 501, an intake tube 502 and an output tube 503. In embodiments, the intake tube and output tube are on opposing sides of the canister to facilitate water flow therethrough. The canister is removably secured to the secured pipe system by securing a segment of the canister, e.g. the output tube 503, to the exposed end of the secured pipe system, by means of opposing threaded surfaces, for example. If necessary, a connector having threaded ends may be used to secure the end of the secured pipe system to the output tube of the canister, wherein for example the connector may have threaded ends which matingly engage with threaded ends of the secured pipe system and the output tube. Other means for securing the output tube of the canister to the exposed end of the secured pipe system may be used. The canister 500 may have any suitable size and shape, for example the canister may be a collapsible bag or a rigid container. In embodiments, the canister 500 has a 10 gallon capacity.

The system and methods of the disclosed technology utilize the canister 500 to inject the eco-friendly gel and sand mixture into the soil. Suitable gels for use in the mixture of the present technology include Superslick #1 gel supplied through Mountaineer Specialty LLC, in Weston, West Virginia; other eco-friendly gels capable of substantially disintegrating in the soil would be suitable as well. In an embodiment, the mixture includes about 5 gallons of gel, 2-4 gallons of water and 10 lbs sand. Once the mixture is deposited in the canister 500, the canister 500 is secured closed. As shown in FIG. 5, a bolt on blind flange 505 can be used to secure the canister 500. Water pressure is then applied to the mixture through the intake tube. Water pressure can be applied in any suitable manner; for example, a triplex pump driven by an A.C. motor can be used to apply pressure from a water source.

The mixture is injected at a \pressure sufficient to cause the gel/sand mixture to penetrate into the soil through the perforations of the secured pipe system 10. Once in the soil, the mixture follows cracks in the soil creating a sand filled crack. Typically, the water pressure supplied is about 100 psi.

The canister 500 is then decoupled from the secured pipe system. Over time the gel will break down and drain back into and through the secured pipe system, leaving just the sand in place. Thereafter, as water traverses or accumulates in the area about the secured pipe system, it accumulates in the sand-filled cracks and is guided into the system and delivered thereby to the surface of the soil at the point of origin.

After the canister is decoupled from the secured pipe system, an exposed portion of the last pipe extending beyond the ground surface may be cut, for example using a saw blade which can be oscillating, hand, or any other type of blade, so that when the secured pipe system is installed at the specific depth the cut end is at or near the surface of the soil.

Additional secured pipe systems may be constructed and installed near the first secured pipe system to further facilitate the removal of water from the site. It is anticipated that each secured pipe system installed in accordance with the technology herein described will withdraw and evacuate water from surrounding soil about a 15' radius of the location of the system; therefore, additional secured pipe systems may be positioned about 30' or more apart one from another to effectively remove water from the site, although the geotechnical report and its revelation of water flow at the site may suggest alternative positioning of additional secured pipe systems at the site.

Figure 7:
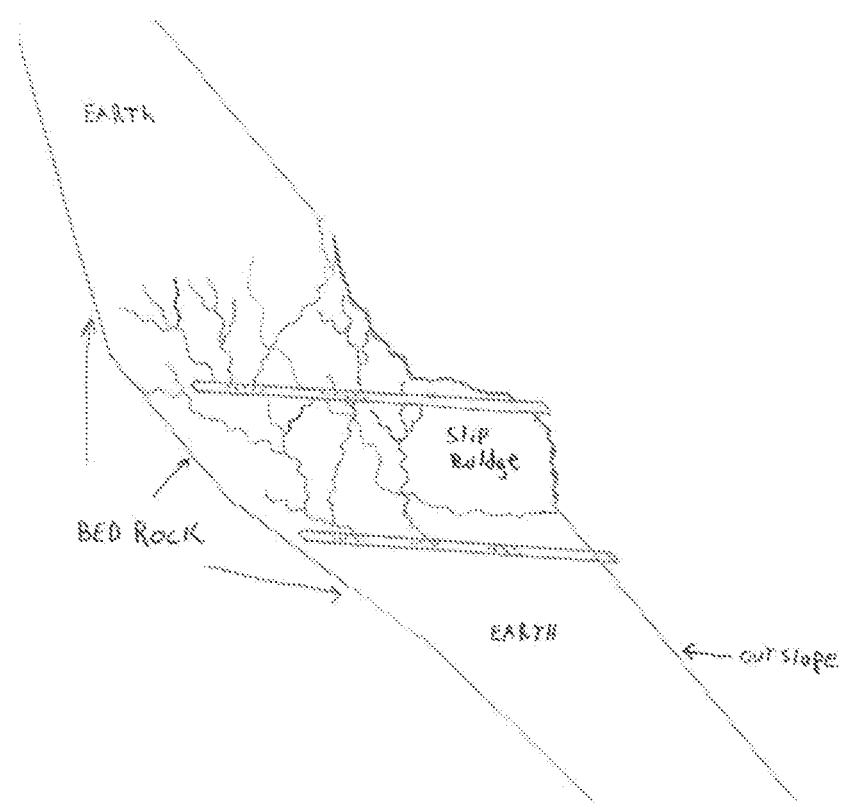
FIG. 7 depicts an exemplary environment with the secured pipe system installed.

FIG. 7 shows an exemplary environment in which soil needs to be drained. In this example, the earth soil includes an area of bedrock and slip bulge caused by the moisture content. The disclosed system can be used in this situation to penetrate the bedrock to the slip bulge in order to drain the moisture. Once the system is installed to reach the bedrock, the soil has both drainage and an anchor.

Figure 8:
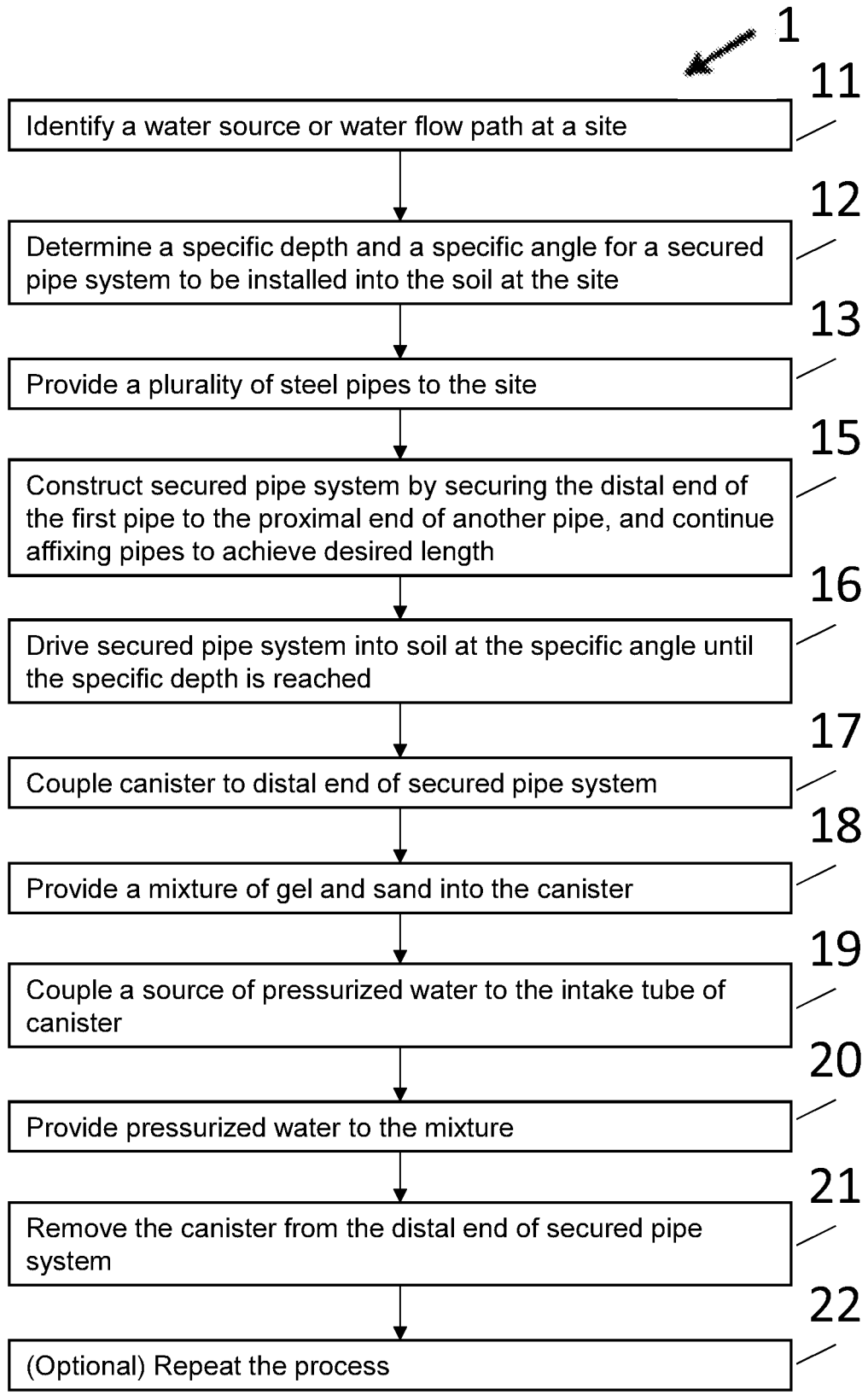
FIG. 8 is a flow diagram depicting a method of the disclosed technology.

FIG. 8 is a flowchart that represents an example embodiment of the methods of installation and use of the disclosed system. Method 1 begins at step 11, where an underground water source or water flow path is identified at a site, using one or more geotechnical reports. At step 12 a specific depth and a specific angle for a secured pipe system to be installed into the soil at the site is determined. The pipes 100, 200, and/or 300 are then provided to the site at step 13. At step 15 the secured pipe system is constructed by securing the distal end of the first pipe to the proximal end of another pipe, and affixing additional pipes thereafter, and the secured pipe system so constructed is driven into the soil at the specific angle at step 16, until the specific depth is reached. At step 17 a canister is coupled to the distal end of the secured pipe system, and a mixture of gel and sand is placed into the canister at step 18. A source of pressurized water is coupled to the intake tube of the canister at step 19, and then pressurized water is provided to the mixture at step 20. Finally, the canister is removed from the distal end of the secured pipe system at step 21. Optionally, at step 22 the process can be repeated for another secured pipe system along contiguous areas of the soil according to the spacing determined at the site.

Modifications, additions, or omissions may be made to method 1 illustrated in the flowchart of FIG. 8. Additionally, the steps of FIG. 8 may be performed in parallel or in any logical order. Moreover, the embodiments described with respect to the present disclosure are expected to be fully combinable and suitable for use in other appropriate embodiments described herein.

The embodiments disclosed herein should be considered to be exemplary in every respect and non-restrictive. The scope of the present disclosure is defined not by the foregoing description of the embodiment but by the claims. The present disclosure is intended to encompass all the alterations that are equivalent in significance and scope to the claims. Features described in any one embodiment may be applied in any other embodiment.

The invention claimed is:

1. A method for draining soil moisture at a site, the method comprising the steps of:
    identifying an underground water source or water flow path at a site;
    determining a specific depth and a specific angle for a secured pipe system to be installed underground at the site so as to penetrate through the water source or water flow path, from a point of origin at, near or above ground;
    providing a plurality of steel pipes to the site, wherein a first of the plurality of pipes comprises a closed pointed tip at its proximal end, wherein one or more of the plurality of pipes has a perforated surface, and wherein the pipes have threaded surfaces at one or more ends to matingly engage the pipes one-to-another to form the secured pipe system;
    constructing the secured pipe system by securing the first and other pipes at their threaded surfaces, and driving the secured pipe system underground from the point of origin and at the specific angle until the specific depth is reached, with a distal end of the secured pipe system extending above the surface of the ground;
    coupling a canister to the distal end of the secured pipe system, the canister comprising a receptacle, an intake tube and an output tube, wherein the canister is coupled to the secured pipe system by securing the output tube to the distal end of the secured pipe system;
    providing a mixture of gel and sand into the canister receptacle;
    coupling a source of pressurized water to the intake tube of the canister and providing pressurized water to the mixture in the canister so that the mixture and water travel out the canister output tube, into and through the secured pipe system and the perforated surfaces of the secured pipe system, and are released into the ground at or near the water source or water flow path, flowing into cracks in the ground creating a sand and gel filled crack; and
    decoupling the canister from the distal end of the secured pipe system, thereby allowing disintegrated gel and water accumulating over time in the ground to flow through the pipe perforations and the secured pipe system out the distal end thereof.

2. The method of claim 1, wherein the step of constructing and driving the secured pipe system underground comprises sequentially securing a pipe to the secured pipe system, driving the system into the ground, securing another pipe to the secured pipe system, further driving the system into the ground, and repeating such steps until the secured pipe system is installed into the ground at the desired depth.

3. The method of claim 1, further comprising cutting the distal end of the secured pipe system extending beyond the ground surface after the canister is decoupled.

4. The method of claim 1, further comprising securing the canister closed with a sealable lid after providing the mixture of gel and sand into the canister and before providing pressurized water to the mixture in the canister, the lid covering the top portion of the canister.

5. The method of claim 1, further comprising providing an adjustable pipe guide cradle system for supporting the secured pipe system at the specific angle as it is driven into the ground.

6. The method of claim 5, wherein the adjustable pipe guide cradle system comprises a base to support the system on a surface and an angularly adjustable cradle for supporting the secured pipe system at the specific angle relative to the base.

7. The method of claim 1, further comprising providing another plurality of pipes and repeating the steps of the method from another point of origin and relative to the same or a different underground water source or water flow path.

8. The method of claim 1, wherein each of the plurality of steel pipes has a length less than or equal to 5'.

9. The method of claim 1, wherein the canister is coupled with the distal end of the secured pipe system by means of a connector having threaded ends to matingly engage with threaded ends of the output tube of the canister and the distal end of the secured pipe system.

10. A method for injecting a drainage mixture into soil, the method comprising:
    coupling a canister to a distal end of an underground secured pipe system, the secured pipe system having a closed pointed tip at its proximal end and a length extending through the soil from a point of origin to a location of water source or water flow, and further comprising surface perforations along at least a portion of the length of the secured pipe system;
    pouring a drainage mixture comprising a gel and sand into the canister;
    applying water pressure to the mixture in the canister, so that the drainage mixture and water travel through the secured pipe system and are forced through the surface perforations of the secured pipe system into the soil, wherein the drainage mixture follows cracks in the soil creating a sand and gel filled crack; and
    decoupling the canister from the distal end of the secured pipe system, thereby allowing disintegrated gel and water accumulating over time in the soil to flow through the pipe perforations and the secured pipe system out the distal end thereof to the surface of the soil.

11. The method of claim 10, wherein the canister is coupled to the distal end of the secured pipe system using a hollow connector threaded to a segment of the canister that is capable of mating with a corresponding threaded segment of the secured pipe system.

12. The method of claim 10, wherein the secured pipe system comprises a plurality of affixed steel pipes, each of the plurality of steel pipes having a length less than or equal to 5'.

13. The method of claim 10, further comprising repeating the method of injecting a drainage mixture with another secured pipe system.

* * * * *